US008368671B2

(12) United States Patent
Schwanenberger et al.

(10) Patent No.: US 8,368,671 B2
(45) Date of Patent: Feb. 5, 2013

(54) DISPLAY DEVICE DRIVING CIRCUIT WITH INDEPENDENTLY ADJUSTABLE POWER SUPPLY VOLTAGE FOR BUFFERS

(75) Inventors: Thomas Schwanenberger, St. Georgen (DE); Heinrich Schemmann, Villingen-Schwenningen (DE); Thilo Marx, Villingen-Schwenningen (DE)

(73) Assignee: Thomson Licensing, Boulogne-Billancourt (FR)

(*) Notice: Subject to any disclaimer, the term of this patent is extended or adjusted under 35 U.S.C. 154(b) by 723 days.

(21) Appl. No.: 11/184,100

(22) Filed: Jul. 19, 2005

(65) Prior Publication Data

US 2006/0022908 A1 Feb. 2, 2006

(30) Foreign Application Priority Data

Jul. 28, 2004 (EP) .................................... 04017851

(51) Int. Cl.
*G06F 3/038* (2006.01)

(52) U.S. Cl. .......................................... 345/204; 345/82

(58) Field of Classification Search ............ 345/98–100, 345/95, 76–83, 87–93, 204
See application file for complete search history.

(56) References Cited

U.S. PATENT DOCUMENTS 3,668,686 A * 6/1972 Strohmeyer .................... 345/22
5,528,751 A * 6/1996 Priem et al. ................... 345/545
6,069,605 A 5/2000 Ozawa
6,107,979 A * 8/2000 Chiu et al. ...................... 345/84
6,144,374 A 11/2000 Hyun
6,175,346 B1 * 1/2001 Chiu et al. ...................... 345/82
6,614,310 B2 * 9/2003 Quarfoot et al. .............. 330/297
(Continued)

FOREIGN PATENT DOCUMENTS

EP 1030287 8/2000
FR 2 607 303 5/1988
(Continued)

OTHER PUBLICATIONS

Search Report Dated Mar. 24, 2005.

*Primary Examiner* — Chanh Nguyen
*Assistant Examiner* — Robert Stone
(74) *Attorney, Agent, or Firm* — Robert D. Shedd; Vincent E. Duffy; James McKenzie

(57) ABSTRACT

A driving circuit for a display with display elements in rows and/or columns has a shift register, through which tokens are shifted. The shift register's parallel outputs are latched and enable switch cells depending on the tokens. Control signals are supplied to the switch cells which control the output signal in terms of pulse width and/or signal shape. Buffers output the signals to a connected display. Individual or groups of buffers are connected to different supply voltages. The shift register may have more than one input in order to allow for shifting tokens in parallel, e.g. to every second output, using only one clock cycle. Further, inputs are provided for inverting the travelling direction of the tokens, inverting the shape of the signal that is output or switching all outputs to a predetermined state.

9 Claims, 8 Drawing Sheets

U.S. PATENT DOCUMENTS

| | | | | |
|---|---|---|---|---|
| 6,987,851 | B1 * | 1/2006 | Toumani et al. | 379/399.01 |
| 7,365,713 | B2 | 4/2008 | Kimura | |
| 8,035,109 | B2 | 10/2011 | Kimura | |
| 2002/0145581 | A1 * | 10/2002 | Kudo et al. | 345/89 |
| 2002/0145600 | A1 * | 10/2002 | Morita | 345/211 |
| 2003/0006955 | A1 * | 1/2003 | Tsuchi | 345/92 |
| 2003/0117352 | A1 | 6/2003 | Kimura | |
| 2003/0174106 | A1 | 9/2003 | Tanada et al. | |
| 2004/0075634 | A1 | 4/2004 | Gates | |
| 2004/0174334 | A1 * | 9/2004 | Washio et al. | 345/102 |
| 2005/0168491 | A1 * | 8/2005 | Takahara et al. | 345/690 |

FOREIGN PATENT DOCUMENTS

| | | |
|---|---|---|
| FR | 2607303 | 5/1988 |
| JP | 2003202834 | 7/2003 |
| JP | 2005134546 | 5/2005 |
| WO | WO 00/19476 | 4/2000 |

* cited by examiner

DISPLAY DEVICE DRIVING CIRCUIT WITH INDEPENDENTLY ADJUSTABLE POWER SUPPLY VOLTAGE FOR BUFFERS

FIELD OF THE INVENTION

This application claims the benefit, under 35 U.S.C §119 of European Patent Application 04017851.9, filed Jul. 28, 2004.

The invention relates to a driving circuit for a display device, particularly to display devices with display elements arranged in rows and/or columns.

BACKGROUND OF THE INVENTION

Display devices according to the invention are, for example, devices using organic light emitting diodes, often referred to by the acronym OLED, or LCD devices. The driving circuit is particularly suited for use in an active matrix display. Active matrix displays have switching elements or other control elements associated with the display elements. Driving circuits are used to select a row or a column of the display in order to be able to address the control elements associated with the display elements. Once a display element is addressed, a voltage or a current may be applied to the control elements for setting the display element in a desired state. However, different driving schemes are necessary for different types of display elements. Further, it may desirable to drive a split screen application. Again further certain display devices may need different voltage levels present at different control lines connected to the control elements of a single display element. It is, therefore, desirable to use a driving circuit that is suitable for driving split screen applications or for supplying different voltage levels at different control lines.

SUMMARY OF THE INVENTION

The inventive driving circuit includes a shift register, which has a serial input and parallel outputs. A bit pattern, also referred to as token, is input and is passed from output to output at every clock cycle. If a token represented by a single bit is input, a logic high level will be present at each output during one clock cycle. The output which shows a logic high level is shifted with every clock cycle. Latching circuits are connected to each output. The latching circuits latch the token. Switch cells are connected to the output of the latching circuits. The switch cells are enabled or disabled, respectively, by the logic signals that are latched in the latching circuits. At least one first control signal is supplied to the switch cell. The first control signal is controlling the output signal of the switch cell, when the switch cell is enabled. Controlling the output signal of the switch cell includes modulation of the output pulse width as well as shaping of rising and/or falling edges.

In a development of the inventive driving circuit a buffer circuit is connected to the output of the switch cell. The buffer circuit is connected to a supply voltage. Buffer circuits for different switch cells may be connected to different supply voltages. In one embodiment of the inventive driving circuit, every second buffer circuit is connected to a supply voltage that is different from the supply voltage of the other buffer circuits. This advantageously allows for controlling display devices, which require two control lines for selecting display elements. Since the two control lines for selecting display elements do not necessarily need the same voltages the power loss in the driving circuit can be greatly reduced by supplying the control voltages that are needed in each case.

In another embodiment of the invention the shift register has a first and a second input. A token that is applied at the first input is shifted with every clock cycle to every second output of the shift register. That is, the token successively appears at the first, the third, the fifth output and so on. A token that is supplied to the second input of the shift register will successively appear at the second, the fourth, the sixth output and so on. Applying the tokens at the inputs of the shift register in an appropriate manner allows for easily selecting the control lines of display elements having two control lines in the required sequence. At the same time a row-by-row selection of two parallel control lines is possible using only one respective clock cycle. This control mode is also referred to as dual-scan mode. Further, the driving circuit allows for a simple implementation of interlaced display modes, in which a full image frame is split into two fields. Each field is including video information for lines of the display. The odd field includes all lines having odd line numbers, and the even field includes all lines having even line numbers. A token for interlace display is entered to the shift register at the first input and shifted by two positions with each clock cycle, i.e. the token appears at outputs with odd numbers. After the token exits the shift register it is re-input at the second input of the shift register and, again, shifted by two positions with each clock cycle, i.e. the token appears at outputs with even numbers.

In another embodiment of the inventive driving circuit the first and the second inputs are used for controlling a split screen application. The outputs that are selected by the token that is input at the first input control a first display or a first part of the display, whereas the token that is input at the second input of the shift register controls the outputs for a second display or a second part of the display.

In developments of the inventive driving circuit an input for reversing the direction in which the tokens travel is provided.

In another development of the inventive driving circuit all outputs of the driving circuit may be set into a predetermined state activated by accordingly applying a signal at an according input. This advantageously allows for switching on all display elements in a display, e.g. for testing purposes.

In yet another development of the inventive driving circuit an input is provided for inverting the output signal. This allows for using an established driving scheme for a display, which requires an inverted driving scheme.

The possibility of switching between single scan and dual scan modes reduces the outlay of the circuitry and allows for a reduction in the wiring required.

BRIEF DESCRIPTION OF THE DRAWINGS

The invention will now be described with reference to the drawing. In the drawing

In the figures same or similar elements are referenced with the same reference numerals.

DETAILED DESCRIPTION OF PREFERRED EMBODIMENTS

Figure 1:
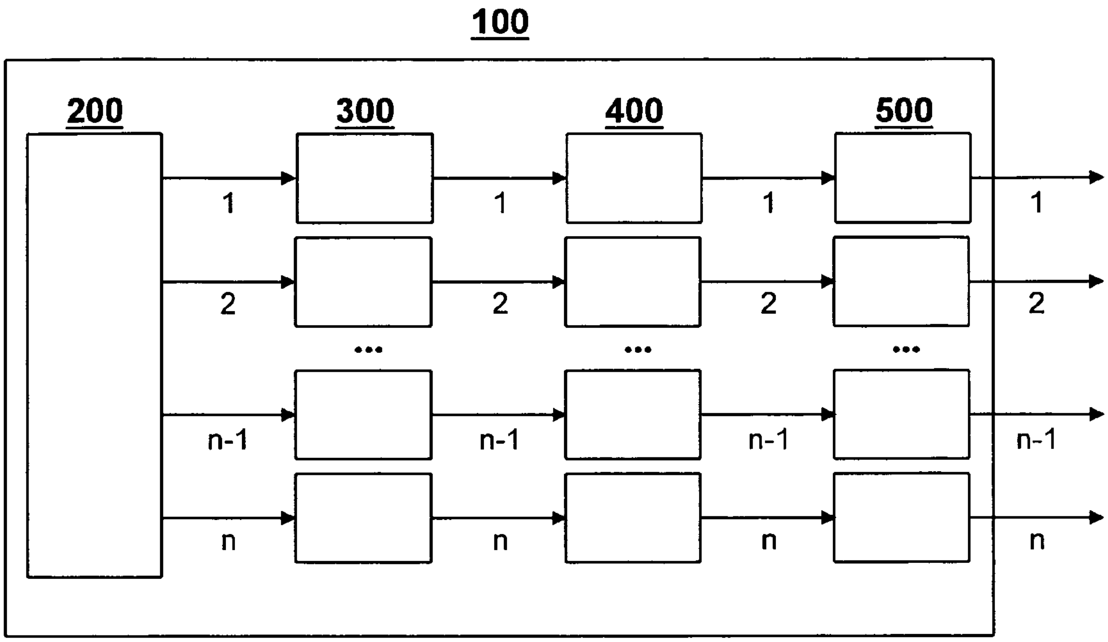
FIG. 1 shows a block diagram of a driving circuit according to the invention.

FIG. 1 shows a block diagram of the inventive driving circuit 100. The driving circuit 100 includes a shift register 200, latching circuits 300, switch cells 400 and buffers 500. The shift register 200 is a serial input n-bit shift register with n parallel outputs. Accordingly, n latching circuits 300, switch cells 400 and buffers 500 are provided. The output of the driving circuit 100 has n output lines, accordingly.

Figure 2:
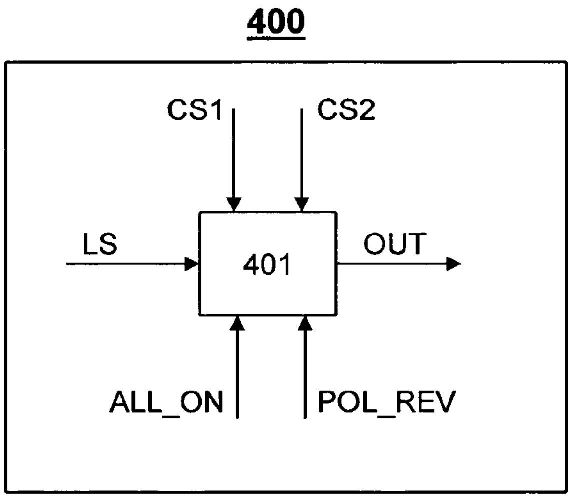
FIG. 2 shows a switch cell according to the invention.

FIG. 2 shows a block diagram of a switch cell 400. The switch cell 400 has a core circuit 401 to which signals LS, CS1, CS2, ALL_ON and POL_REV are supplied. The switch core 401 further has an output OUT. The signal LS is an enabling signal from the latching circuit 300. Signals CS1 and CS2 are used for controlling the output signal in terms of pulse width and/or pulse shape. The control signals CS1 and CS2 may further control the maximum and minimum voltage of the output signal OUT. The signals ALL_ON and POL_REV are supplied to all switch cells in parallel. In contrast to the other signals, the signal ALL_ON will cause the output signal to maximum voltage independent of the enabling signal LS from the latching circuit. This allows for switching on all display elements for calibration or testing purposes, without having to apply a dedicated token to the shift register for this purpose. Using a dedicated token is a slower process than using the ALL_ON signal, since the appropriate token would have to be passed to all outputs of the shift register through a corresponding number of clock cycles. The immediate switching on of all display elements reduces the variation of the brightness due to leakage currents, which affect the signal stored in a signal storing means. The POL_REV signal determines whether the output signal forced by using the ALL_ON signal is maximum or minimum voltage. Further, the POL_REV signal may be used for inverting the output signal during normal operation, thus allowing for using n-type or p-type display elements. N-type or p-type display elements differ in the type of switches used, i.e. in the polarity of the control signal of the switches.

Figure 3:
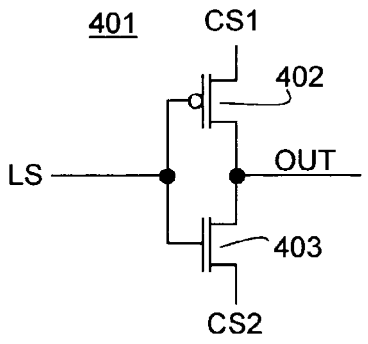
FIG. 3 illustrates a detail of the inventive switch cell.

FIG. 3 shows a detail of the switching core 401. The enabling signal LS controls two switches 402 and 403. The switches are designed in an alternative switching arrangement, that is, when switch 402 is conducting switch 403 is non-conducting and vice versa. When switch 402 is conducting the control signal CS1 present at the input of switch 402 is transferred to the output of the switch core 401. When switch 403 is conducting the control signal CS2 present at input of switch 403 is transferred to the output of the switch core 401.

Figure 4:
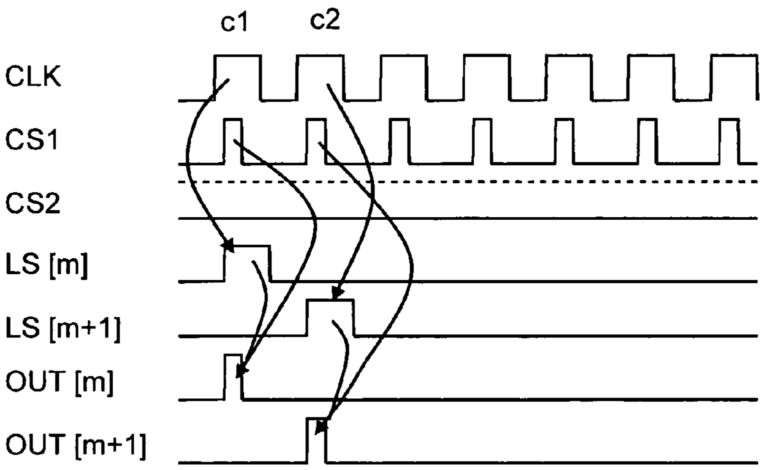
FIG. 4 depicts the output signals of selected outputs of the driving circuits versus the clock cycle.

FIG. 4 exemplarily shows the signals of selected outputs of adjacent switch cells and the clock signals CLK as well as the control signals CS1 and CS2, respectively. The control signals CS1 and CS2 are synchronised with the clock signal CLK, but may be free in duty cycle and pulse width or shape. During a first clock cycle c1 an according token shifted through the shift register effects a latch signal LS[m] to assume a logic high level. While the signal LS[m] is logic high the control signal CS1 is applied. The output signal OUT[m] equals the control signal CS1 logically ANDed with the latching signal LS[m]. The state of the control signal CS2 is low for the complete driving sequence. Therefore, when the latching signal LS[m] is logically low the control signal CS2 is applied at the output OUT[m]. During the next clock cycle c2 the token is passed on to the next output of the shift register. Consequently, the latching signal LS[m+1] has a logic high level. The output signal OUT[m+1] is the logic AND combination of the control signal CS1 and the latching signal LS[m+1]. The output signal is depending on the control signals CS1 and CS2. If the control signal CS1 had a trapezoidal shape the corresponding output signal would have the same trapezoidal shape. This allows for controlling the shape of the output signals not only in level but also the rising and/or falling edges, or the transitions in general. Controlling the shape of the output signal may be useful for reducing electromagnetic interference between neighbouring components or signal lines. In the figure, delay that may occur in a real application is not considered.

Figure 5A:
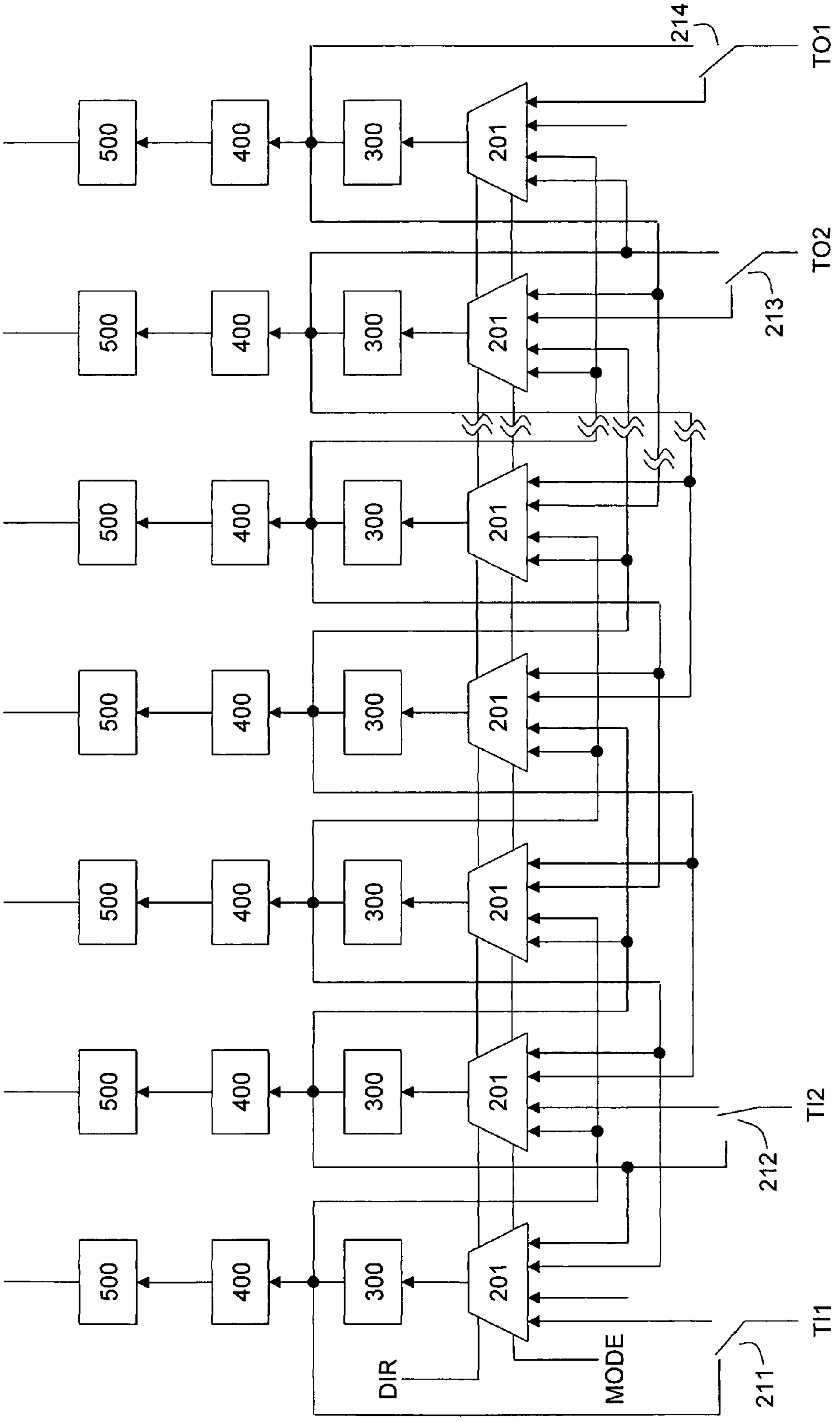
FIG. 5*a* is a schematic block diagram of an inventive driving circuit.

FIG. 5*a* shows a schematic block diagram of an inventive driving circuit. The shift register 200 is represented by multiplexers 201. The inputs of the multiplexers are selected depending on the signals DIR and MODE, which, in this exemplary circuit, select the shifting direction and the stepwidth. In the figure, only 7 cells of the shift register are shown. However, a shift register in an inventive driving circuit may have any arbitrary number of cells. The outputs of the multiplexers are connected to latching circuits 300. The latching circuits 300 enable or disable respective switch cores 400. The outputs of the switch cores 400 are connected to respective buffers 500, which form the outputs of the driving circuit. Switches 211 to 214 are used as inputs or outputs TI1, TI2, TO1 TO2 to the shift register, depending on their state. It is to be noted that, despite their designation, the inputs and outputs may be configured to be outputs and inputs, respectively.

Figure 5B:
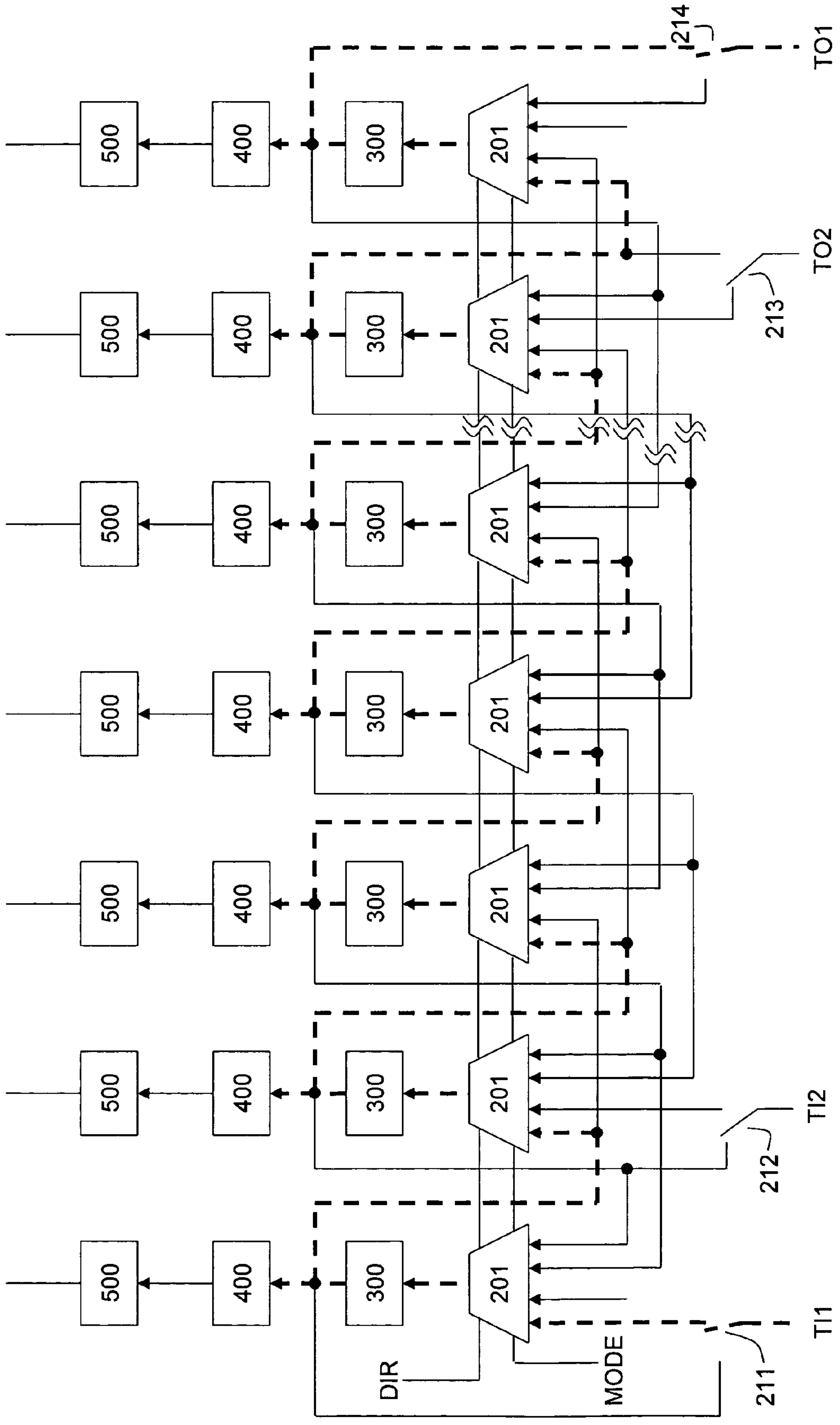
FIG. 5*b* shows the signal path through the driving circuit in a first operating mode.

FIG. 5*b* illustrates the signal path of a token in a first operating mode. The token is input at TI1. Switch 211 is, therefore, making a connection to a first input of multiplexer 201. The signal path is shown by the bold dashed line. Signals DIR and MODE are chosen so as to select the first inputs of all multiplexers. Thus, on every clock cycle, the token is shifted to the next cell of the shift register. Eventually, the token exits the shift register at the output TO1. The switch 214 is, therefore, connecting the output of the latching circuit 300 to the output.

Figure 5C:
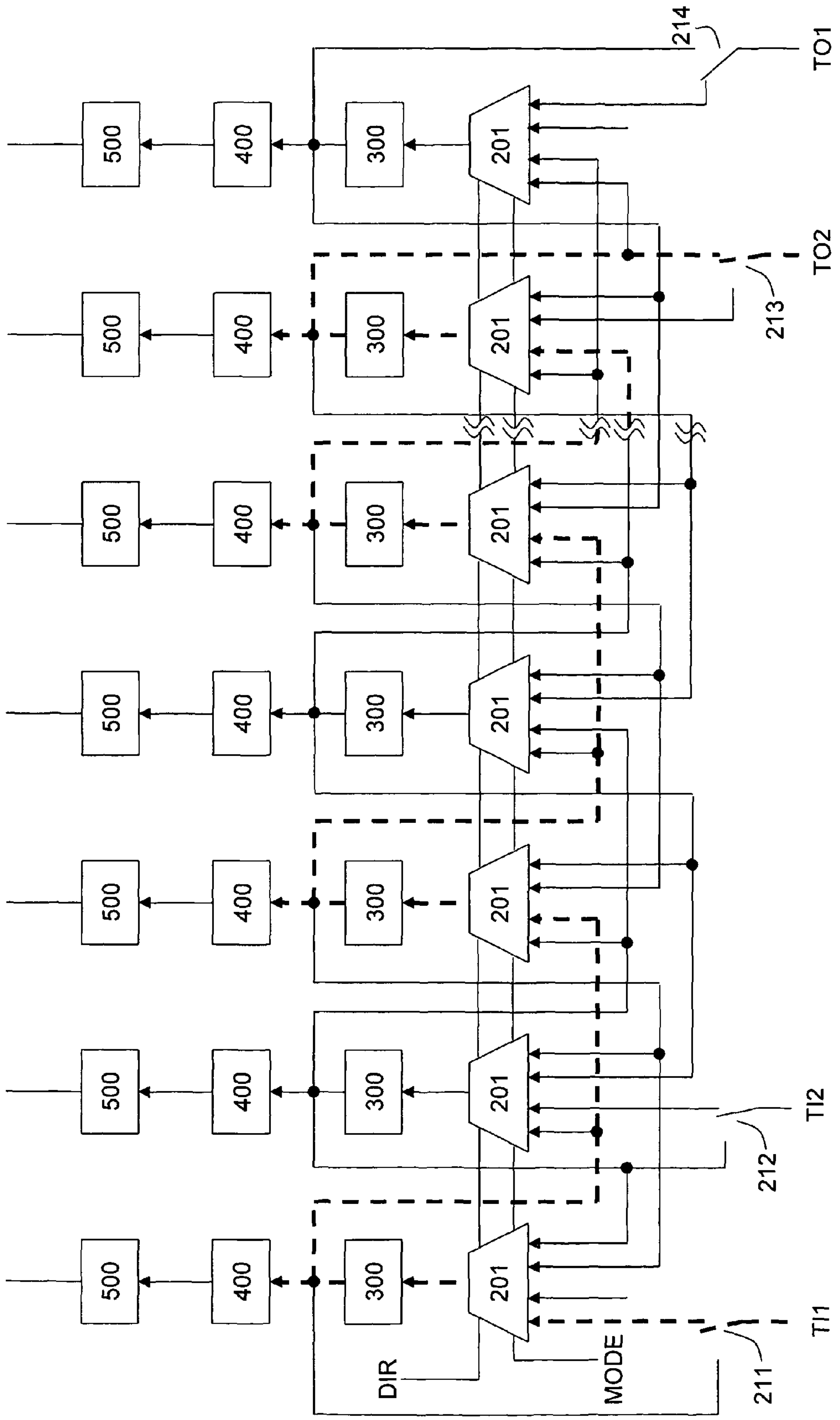
FIG. 5*c* shows the signal path through the driving circuit in a second operating mode.

FIG. 5*c* illustrates the signal path of a token in a second operating mode. Again, the token is input at input TI1. The first and the second inputs of the first multiplexer 201 are connected to each other. A connection is made from the output of the latching circuits 300 to the first input of the next multiplexer and the second input of the second next multiplexer in the line. Signals DIR and MODE are chosen so as to select the second inputs of all multiplexers. Thus the token is travelling through every second cell of the shift register on every clock cycle. Eventually, the token exits at the output T02. Switch 213 is switched accordingly.

Figure 5D:
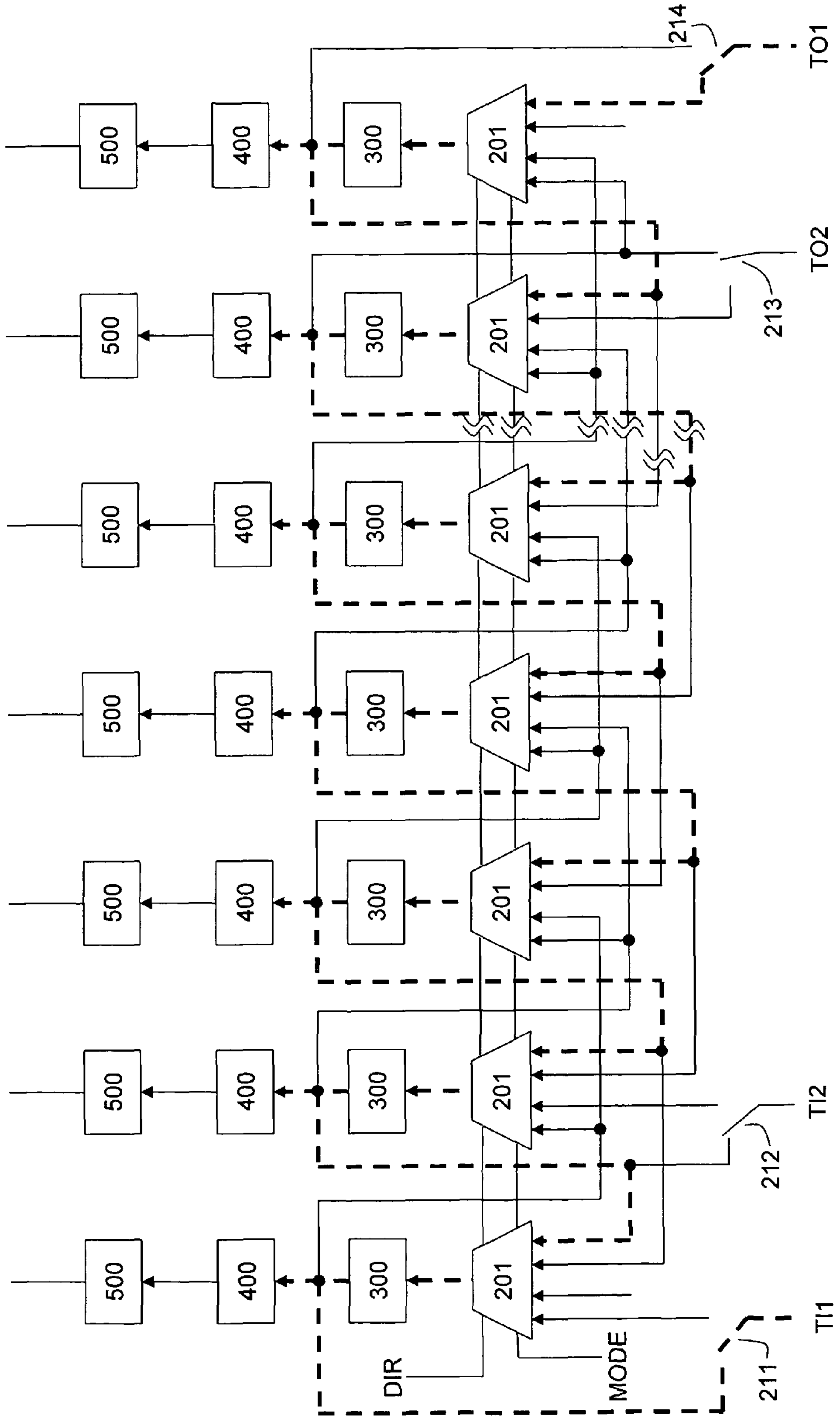
FIG. 5*d* shows the signal path through the driving circuit in a third operating mode.

FIG. 5*d* illustrates the signal path of a token in a third operating mode. This time the token is input at input TO1. Switch 214 is switched accordingly. Signals DIR and MODE are chosen so as to select the fourth input of every multiplexer. Every output of the respective latching circuits 300 is connected to the fourth inputs of the preceding multiplexers and the third inputs of the second preceding multiplexers in the line. In this case the token travels to the preceding cell of the shift register on every clock cycle.

Figure 5E:
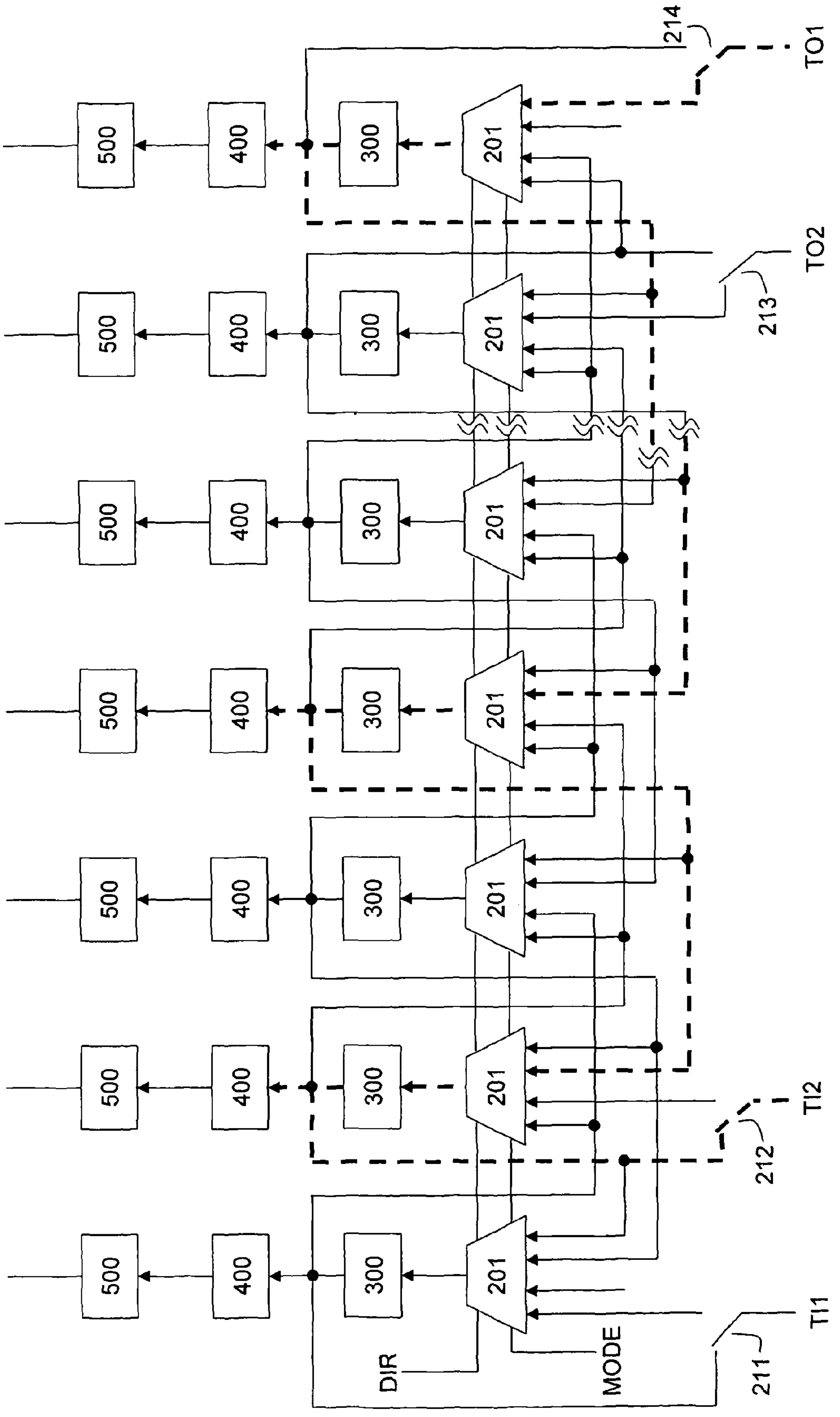
FIG. 5*e* shows the signal path through the driving circuit in a fourth operating mode.

FIG. 5*e* illustrates the signal path of a token in a fourth operating mode. Again, the token is input at input TO1.

Switch 214 is switched accordingly. Signals DIR and MODE are chosen so as to select the third input of every multiplexer. The third and fourth inputs of the last multiplexer are connected to each other. The token travels from right to left through every second cell of the shift register on every clock cycle.

To access the cells that are omitted in the aforementioned second and fourth operating modes, tokens may be input at the respective inputs TI2 and TO2. Switches 212 and 213 have to be set accordingly.

Depending on the number of cells of the switch registers and the desired number of outputs for the driving circuit, multiple shift registers may be cascaded.

For single scan displays and display elements, the selection impulse, or token, for selecting a row or a column can be input to the two individual inputs pins TI1 or TI2, depending on the display type. The token is sent to the shift register and will cycle by cycle select one output after the other, until it appears at the output pin TO1 or TO2. The control signal DIR determines the direction of the bidirectional token transfer. The number of controllable rows may vary.

The input control signal MODE further allows to select one or more tokens to be send to the driving circuit in parallel. In this case the first token is input at TI1 and exits at TO2, or vice versa, depending on the control signal DIR. The second token is input at TI2 and exits at TO1, or vice versa, depending on the control signal DIR. The token transfer direction of both tokens is the same, but is selectable. Using this function, a dual scan mode can be effected, allowing to drive display elements using two scan inputs, or split screen applications. Each token appears at every second output. For example, in a n-bit shift register arrangement with n corresponding latches 300, switch cells 400 and buffers 500, token 1 selects rows 1, 3, 5, and so on, and token 2 selects rows 2, 4, 6, and so on.

Figure 6:
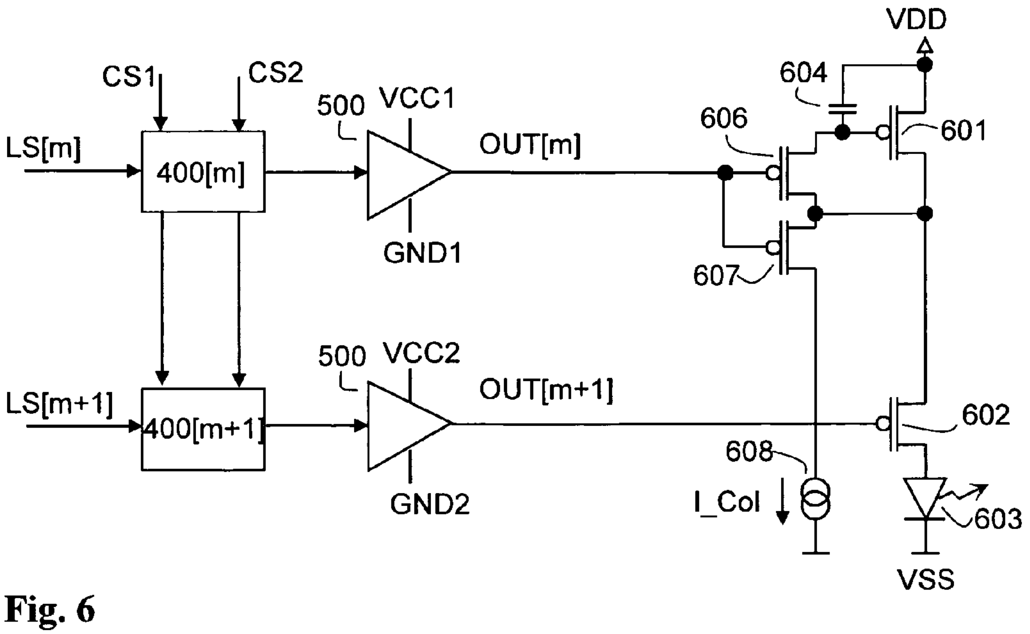
FIG. 6 is a detail of an inventive driving circuit and a connected display element requiring two driving signals.

FIG. 6 shows a detail of an inventive driving circuit in conjunction with a display element. The display element requires two control lines, which have to be activated in a predetermined sequence. The display element is, for example, an OLED element that has a current control means 601 and a switching means 602 associated with the light emitting OLED 603. The display element is of a current-controlled type. Current-controlled display elements require a current necessary for operation to be applied to the current control means 601. A storage means 604 is provided, which keeps the programmed current constant until the next programming cycle. During programming the current the display element must not be active. Therefore, the latch signal LS[m+1] is selected such that the output signal OUT[m+1] opens the switch 602 during current programming. Once the switch 602 is open the latching signal LS[m] is activating the switch cell 400[m]. Control signals CS1 and CS2 are applied such that the output signal OUT[m] activates switched 606 and 607. A control current is programmed by activating a current source 608. The required current is flowing from the power supply VDD via the current control means 601 and the switch 607. At the same time a control voltage builds up at a control terminal of the current control means 601. The control voltage is stored in storage means 604. When the current has settled switches 606 and 607 are opened and switch 602 is closed. The storage means 604 holds the potential required for maintaining the programmed current until the next programming cycle. The programmed current is now flowing through the light emitting element 603. The signals OUT[m] and OUT[m+1] are controlled by respective tokens that are shifted through the shift register. Control signals CS1 and CS2 are passed through to the respective outputs that are selected by the tokens.

The power consumption in this so-called dual scan mode is reduced by adding a second power supply for the output buffers 500. In this example three different power supply voltages are present:

VDD−VSS: supply voltage for the display element
VCC1−GND1: voltage supply for switches 606, 607
VCC2−GND2: voltage supply for switch 602

For the buffer output OUT[m] the supply voltage must be high enough to make sure that switches 606, 607 are switched off in the respective operation mode. Typically field-effect transistors, or FET, are used as switches. The minimum voltage for VCC1 is thus VDD+VX, wherein VX is the gate-source-voltage of the FET that is required to switch the transistor off. On the other hand, switches 606, 607 must be switched on for storing the signal representing the video data content in the storage means 604. Thus, the maximum voltage for GND1 is VDD−(2*VGS)−VDS, wherein VDS is the voltage across the drain and source terminals of the FET when the FET is switched on, i.e. in saturation mode.

For the buffer output OUT[m+1] the supply voltage must be high enough to make sure that switch 602 is switched off in programming mode. The minimum voltage for VCC2 is thus VDD−VGS+VX−VDS. The maximum voltage for GND2 to make sure switch 602 is fully opened during operation VDD−(2*VGS)−VDS. In the foregoing example it is assumed that the outputs of the buffers are capable to reach the supply voltages. In case the buffers do not have rail-to-rail outputs, the voltage drop in the buffers has to be considered.

In an example VDD is +21V, VX is +3V, VDS(sat) is 1V and VGS is 10V, wherein the transistors operate in saturation mode. Thus VCC1 must be at least 24V, GND1 must be lower than or equal to 0V, VCC2 must be at least 13V, and GND2 must be lower than or equal to 0V. It is clearly visible that for VCC1 is almost twice as high as VCC2. Therefore, the individual power supplies for VDD, VCC1 and VCC2 reduce the total power consumption.

Figure 7:
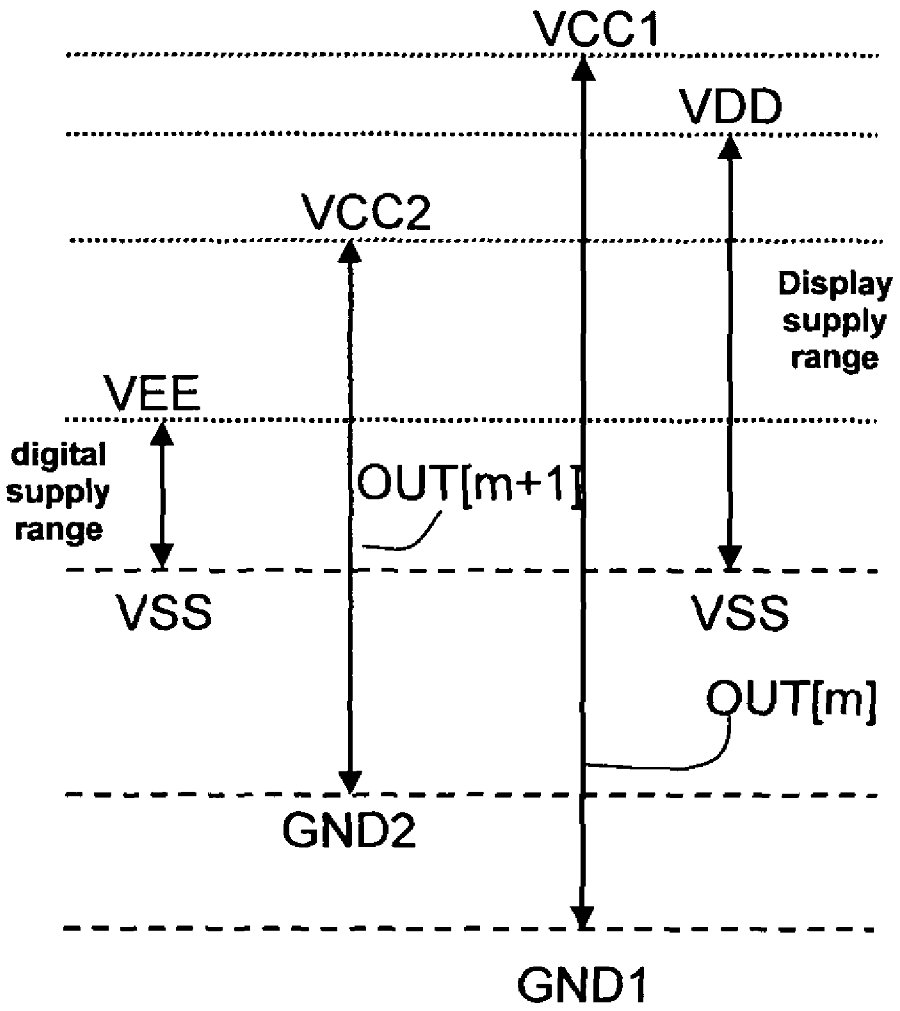
FIG. 7 displays the different supply voltages required for different control lines of FIG. 5

FIG. 7 depicts the different supply voltages required for driving the different control lines of the circuit of FIG. 6. The supply voltage range for the digital circuitry is defined by the voltage VEE and the ground potential VSS. The digital supply voltage VEE typically ranges from 3 to 5 volts. However, other voltages are possible. The supply voltage for the display elements ranges from ground VSS to a supply voltage VDD. Typically, the supply voltage VDD is much higher than the supply voltage for the digital circuitry VEE. The supply voltage range for the output lines OUT[m] depends on which line is connected to which switches of the display element. Referring to the reference numerals used in FIG. 6 the supply voltage VCC2 that is needed for the driver, which activates switch 602 must be higher than the supply voltage for the digital circuitry. However, it may be lower than the supply voltage for a display element VDD. Further, the low potential GND2 must be lower than the ground potential VSS of the digital circuitry and the display. The supply voltage range that is required for switching the switches 606 and 607, however, is different from the other supply voltage ranges. The required supply voltage VCC1 is higher than the supply voltage VDD of the display element and the low potential GND1 is lower than the low potential GND2. The possibility of supplying different supply voltages to the drivers 500 of individual outputs or groups of outputs allows for reducing the dissipated power in the drivers.

In case the driving circuit is integrated into an integrated circuit the various supply voltages can be applied externally to the IC or can be generated by an on-chip DC-to-DC converter. The second alternative may be more efficient in component cost and may provide improved noise isolation.

What is claimed is:

1. A driving circuit for a display with display elements arranged in rows and/or columns, the driving circuit being adapted to selectively provide to first and second switches of each respective display element, a first and a second switching signal, wherein the driving circuit comprises a shift register having at least one input and a multiplicity of outputs, wherein the shift register is operable to select individual display elements or groups of display elements, for providing said first and second switching signals to the first and second switches of each selected display element, wherein each of the multiplicity of outputs provides one of the first or second switching signals, wherein each of the multiplicity of outputs of the shift register has a buffer circuit associated with said output for buffering the first or second switching signal provided by the respective output of the shift register, wherein each buffer circuit has two power supply voltage terminals, wherein the power supply voltage terminals of buffer circuits buffering the first switching signals are connected to power supply voltages having levels different from the levels of those power supply voltages to which buffer circuits are connected that buffer the second switching signals, wherein the power supply voltages are connected in accordance with the required magnitude of the first or second switching signal.

2. The driving circuit of claim 1, wherein a switch cell is provided for each buffer circuit and connected to an input of the respective buffer circuit, wherein the switch cell is adapted to receive driving signals, wherein each switch cell is connected to at least a first and a second control signal, wherein the level and/or the transitions of the signal that is present at the output of the switch cell is controllable by the at least first and second control signals, and wherein the switch cell is adapted to receive at least one logical control signal exclusively selecting the first or second control signal to he effective.

3. The driving circuit of claim 2, wherein a third control signal is applied to each of the switch cells in parallel, wherein the third control signal sets the output of the switch cells to a predetermined state.

4. The driving circuit of claim 2, wherein a fourth control signal is applied to the switch cells, wherein the fourth control signal inverts the resulting signal that is present at the output of the switch cells.

5. The driving circuit of claim 1, wherein latch circuits are provided with each one of the multiplicity of outputs of the shift register.

6. The driving circuit of claim 1, wherein the shift resister has a first serial input and parallel outputs, wherein a multiplexer is provided with respective internal parallel inputs of every cell of the shift register, wherein output signals of cells of the shift register are supplied to respective internal parallel inputs of two adjacent preceding and/or subsequent cells of the shift register, wherein output signals of cells of the shift register are supplied to respective internal parallel inputs of cells preceding and subsequent to, respectively, the immediately adjacent preceding and subsequent cells of the shift register, and wherein the multiplexer is controlled by respective control signals.

7. The driving circuit of claim 6, wherein the shift register has a second serial input for inputting tokens independent from and in parallel to tokens input at the first serial input and/or a second and/or a first serial output for independently and in parallel outputting the first and second tokens.

8. The driving circuit of claim 7, wherein a first token, which is input at the first input, is shifted to respective first cells of the shift register and wherein a second token, which is input at the second input, is shifted to respective second cells of the shift register with every clock cycle, the first and second tokens skipping every other cell.

9. The driving circuit of claim 6, wherein the direction of travel and the step-width of the input signal or token is controllable by the control signals.

* * * * *